United States Patent [19]

Okubo

[11] Patent Number: 5,303,988
[45] Date of Patent: Apr. 19, 1994

[54] ANTI-LOCK CONTROL METHOD AND APPARATUS

[75] Inventor: Satomi Okubo, Saitama, Japan

[73] Assignee: Akebono Brake Industry Co., Ltd., Tokyo, Japan

[21] Appl. No.: 974,836

[22] Filed: Nov. 13, 1992

Related U.S. Application Data

[63] Continuation of Ser. No. 694,763, May 2, 1991, abandoned.

[30] Foreign Application Priority Data

May 9, 1990 [JP] Japan .................. 2-117684

[51] Int. Cl.$^5$ ............................. B60T 8/62
[52] U.S. Cl. ........................ 303/103; 303/110; 364/426.02
[58] Field of Search ............... 303/102, 103, 107–111; 364/426.01–426.03

[56] References Cited

U.S. PATENT DOCUMENTS

| 3,964,796 | 6/1976 | Bremer | 303/107 |
| 4,321,676 | 3/1982 | Ohmori et al. | 303/109 X |
| 4,787,682 | 11/1988 | Muto | 303/109 |
| 4,984,164 | 1/1991 | Maehara et al. | 364/426.02 |
| 5,016,178 | 5/1991 | Kuwana et al. | 303/97 X |
| 5,019,984 | 5/1991 | Masaki et al. | 364/426.02 |
| 5,033,799 | 7/1991 | Braschel | 303/110 X |

FOREIGN PATENT DOCUMENTS

| 3929996 | 3/1990 | Fed. Rep. of Germany . |
| 4030617 | 4/1991 | Fed. Rep. of Germany . |

Primary Examiner—Robert J. Oberleitner
Assistant Examiner—Alfred Muratori
Attorney, Agent, or Firm—Cushman, Darby & Cushman

[57] ABSTRACT

An anti-lock control arrangement for preventing locking of vehicle wheels by increasing, holding constant and decreasing brake hydraulic pressure through a plurality of control channels on the basis of system speeds Vs, an estimated vehicle speed Vv, a target speed VT and accelerations and decelerations dVs/dt of the vehicle wheels. With respect to one of the control channels, the target speed VT is modified when there is a speed difference $\Delta V$ between corresponding one of said system speeds Vs and the highest wheel speed VwH at the time of start of braking. The modified target speed is defined by a speed lowered by the speed difference $\Delta V$ than said target speed VT.

8 Claims, 7 Drawing Sheets

ANTI-LOCK CONTROL METHOD AND APPARATUS

This is a continuation of application Ser. No. 07/694,763, filed on May 2, 1991, which was abandoned upon the filing hereof.

CROSS-REFERENCES TO CO-PENDING APPLICATIONS

This subject matter set forth in this application is generally related to the subject matter disclosed in the following applications and/or patents, however, the claims are distinct in each of them:

U.S. patent application Ser. No. 07/975,968;
U.S. patent application Ser. No. 08/099,406; and
U.S. Pat. No. 5,185,704.

BACKGROUND OF THE INVENTION

The present invention relates to an anti-lock control method and apparatus for preventing locking of automotive wheels of a running vehicle.

Generally, in an anti-lock control apparatus for automotive vehicles, to maintain steering ability and running stability during braking, a control unit including a microcomputer controls brake hydraulic pressure. This brake pressure control also reduces braking distance.

During operation of the anti-lock control apparatus, a control mode for brake hydraulic pressure is determined based on an electric signal indicative of a wheel speed. This wheel speed is detected e a wheel speed sensor. According to the control mode, a hold valve, which is a normally opened solenoid valve, and a decay valve which is a normally closed solenoid valve, are selectively opened or closed to increase, hold constant and decrease the brake hydraulic pressure.

In such anti-lock control, as disclosed in the U.S. Pat. No. 4,984,164, a reference speed for deciding when to decrease the brake hydraulic pressure is set or determined in accordance with a wheel speed (herein after referred as system speed Vs) to be controlled in each brake control system. There is also set an estimated vehicle speed Vv having a predetermined follow-up limit of acceleration/deceleration with respect to the highest wheel speed among four wheel speeds. Further, there is set a threshold speed which tracks the estimated vehicle speed Vv with a predetermined speed difference therefrom and below the estimated vehicle speed Vv.

Based on the comparison of the system speed Vs with the reference speed or the threshold speed and also on the detected high peak point and low peak point of the system speed Vs, a pressure decrease status, a pressure hold status and a pressure increase status are set. Then, a plurality of hydraulic pressure valves (solenoid valves) are turned on and off in accordance with a predetermined control mode set for each of these statuses, thereby effecting the pressure decrease, pressure hold and pressure increase.

The above-mentioned control method, however, suffers from a problem in that the control mode remains fixed or unchanged until the status is changed, even when the wheel speed is abruptly changed due to variations in the road condition. Thus, the method fails to react in a timely manner which is particularly disadvantageous because the wheels may lock during abrupt braking. Another disadvantage is that since the pressure increase is effected at the time when the wheel speed recovers to a speed near the vehicle speed, the wheel speed is repeatedly accelerated and decelerated in a speed range having a certain slip rate with respect to the vehicle speed. As a result, the brake hydraulic pressure is increased and decreased causing a vibration of the vehicle body.

RELATED ART OF THE INVENTION

Then, the present inventor investigated the problem and filed the U.S. patent application Ser. No. 07/591,056 which proposes an improved anti-lock control arrangement.

In the arrangement, a target speed VT is set for all system speeds Vs to track the estimated vehicle speed Vv according to a predetermined relation thereto, and the brake hydraulic pressure is controlled such that each system speed Vs is converged to the target speed VT.

However, in turning of the vehicle, there is a speed difference between the inner and outer wheel speeds thereof, so that the inner wheel is earlier subjected to the anti-lock control through a corresponding anti-lock control system or channel to which the inner wheel belongs if the anti-lock control is performed to cause both the inner wheel speed having a lower speed and the outer wheel speed having a higher wheel speed to be converged to the common target speed VT. As a result, with respect to the inner wheel in the turning of the vehicle, the braking force is made to be insufficient

SUMMARY OF THE INVENTION

The present invention was made in order to solve the above-mentioned problems.

Accordingly, it is an object of the present invention to provide an anti-lock control method for preventing locking of vehicle wheels during braking, in which the brake hydraulic pressure is prevented from becoming insufficient due to the lower speed of the inner wheel of the vehicle at the time of the braking in turning thereof for the purpose of reducing the braking distance.

In the method, a estimated vehicle speed Vv is calculated on the basis of the highest wheel speed VwH among the speeds of the four wheels of the vehicle, a speed which follows the estimated vehicle speed Vv with a predetermined difference therefrom is set as a target speed VT common to control channels for the speeds of the wheels, and the brake hydraulic pressure for the wheels is regulated so that the wheel speeds which are subjected to the anti-lock control through the control channels converge to the target speed VT. The method is characterized in that when there is a speed difference $\Delta V$ between the system speed Vs and the highest wheel speed VwH at the time of the start of the braking of the vehicle, a speed lowered by the speed difference $\Delta V$ is set as a modified target speed VT' for the control channel to subject the system speed Vs to the anti-lock control. As a result the brake hydraulic pressure is prevented from becoming insufficient due to the lower speed of the inner wheel of the vehicle at the time of the braking in turning thereof. Therefore, the braking distance can be reduced.

DETAILED DESCRIPTION OF THE PREFERRED EMBODIMENTS

An embodiment of the present invention is hereinafter described in detail with reference to the drawings attached hereto.

Figure 1:
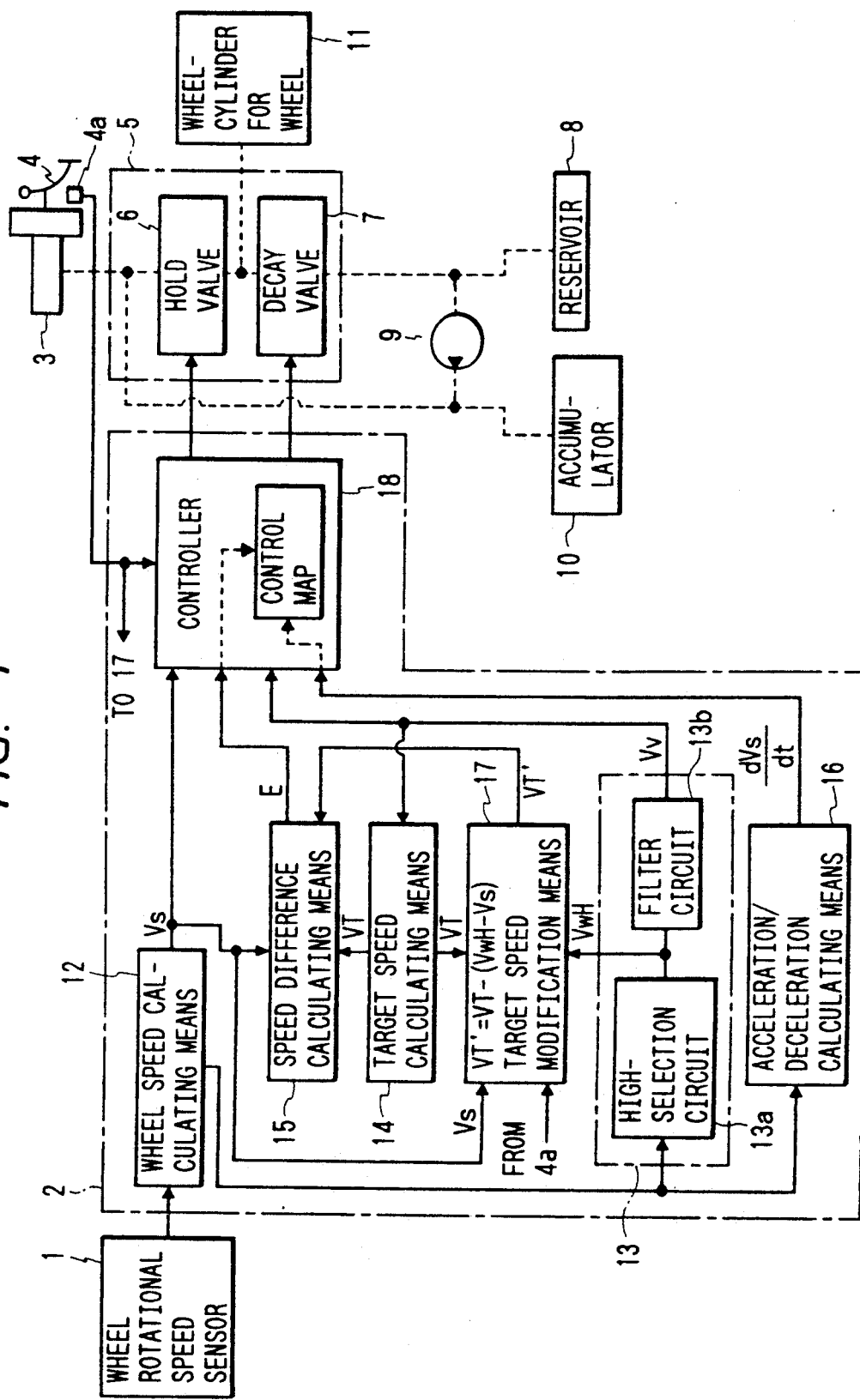
FIG. 1 is a block diagram of a control system used in an anti-lock control method according to an embodiment of the present invention.

FIG. 1 is a block diagram showing an anti-lock control apparatus for practicing an anti-lock control method according to an embodiment of the present invention. The apparatus comprises wheel rotation speed sensors 1 respectively attached to four wheels of a vehicle for detecting wheel speeds Vw, a control unit 2 made of a computer, and modulators 5 including hold valves 6, which are normally opened solenoid valves, and decay valves 7, which are normally closed solenoid valves. The apparatus further comprises a master cylinder 3, which is operated by a brake pedal 4, a brake switch 4a, which is turned on by depressing the pedal 4, a reservoir 8, a pump 9 an accumulator 10, in which a brake fluid can be stored from the reservoir by the pump, and wheel cylinders 11 of brakes for the wheels.

The control unit 2 includes wheel speed calculation means 12, estimated vehicle speed calculation means 13, target speed calculation means 14, speed difference calculation means 15, acceleration/deceleration calculating means 16, target speed modification means 17 and controller 18. The wheel speed calculation means 12 calculates system speed Vs for the respective control systems or channels of the anti-lock control apparatus based on output signals from the wheel speed sensors 1. The estimated vehicle speed calculation means 13 calculates an estimated vehicle speed Vv based on output signals from the wheel speed calculation means 12. The estimated vehicle speed calculation means includes highest speed selection circuit means 13a for selecting the highest wheel speed VwH from among four wheel speeds Vw based on output signals from the system speed calculation means 12, and filter circuit means 13b for regulating limits of acceleration/deceleration of the highest wheel speed VwH within ±1G to obtain the estimated vehicle speed Vv. The target speed calculation means 14 calculates a target speed VT which is common to the control systems or channels of the anti-lock control apparatus and which follows the estimated vehicle speed Vv with a predetermined speed difference therefrom. The speed difference calculation means 15 calculates a difference E (which is equal to Vs VT) between the system speed Vs and the target speed VT. The acceleration/deceleration calculation means 16 calculates a rate dVs/dt of the increase or decrease in the system speed Vs. The target speed modification means 17 modifies the target speed VT only for the control channel for the wheel speed if the wheel speed is lower than the other wheel speed as in the case that the speeds of the inner and outer wheels of the vehicle in turning thereof differ from each other.

More specifically, the target speed modification means 17 functions so that if there is a speed difference ΔV (which is equal to VwH − Vs) between the highest wheel speed VwH and the system speed Vs when the brake switch 4a is turned on, a speed lower by the speed difference ΔV than the target speed VT is generated as a modified target speed VT' (which is equal to VT − ΔV) for the control channel of the system speed Vs and then transmitted to the speed difference calculation means 15.

Figure 2:
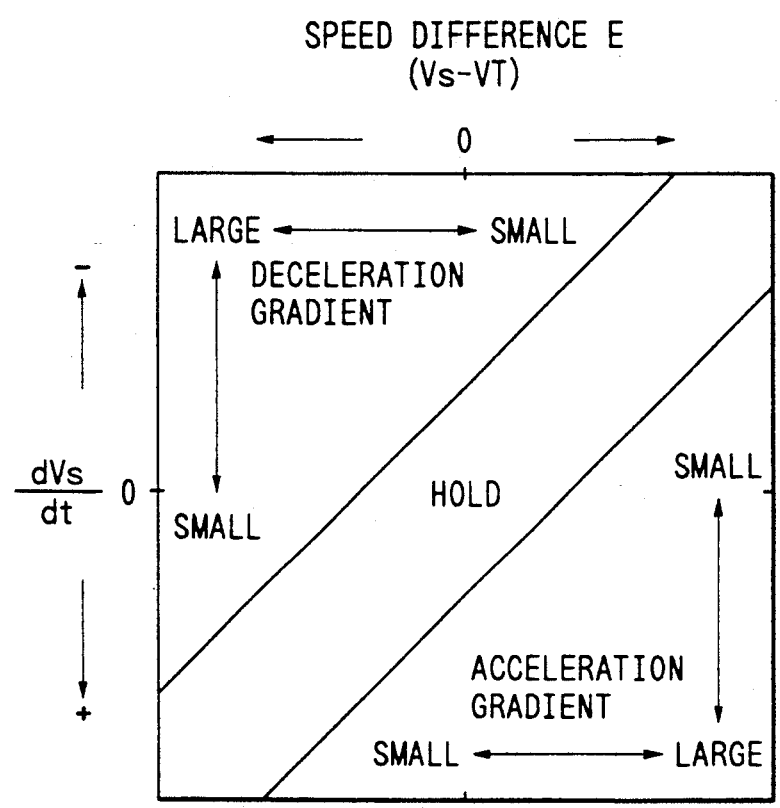
FIG. 2 shows a control map used in the anti-lock control method of the embodiment.

The controller has a memory in which a control map shown in FIG. 2 is stored. The control map shown in FIG. 2 has an axis of abscissas for the difference E between the system speed Vs and the target speed VT, and an axis of ordinates for the rate dVs/dt of the increase or decrease in the system speed Vs, and also has a brake hydraulic pressure increase region, a brake hydraulic pressure holding region, and a brake hydraulic pressure decrease region. The different values of the gradient of pressure increase in the pressure increase region and those of the gradient of pressure decrease in the pressure decrease region are shown as control values in the control map. The gradient of pressure increase is defined by the duty ratio of a pressure increase signal which is applied to the hold valve 6. Similarly, the gradient of pressure decrease is defined by the duty ratio of a pressure decrease signal which is applied to the decay valve 7. The controller 18 reads the control values from the control map to perform control to open or close the hold valve 6 and the decay valve 7 to make the brake hydraulic pressure in the wheel cylinder 11 increased, held constant or decreased.

Figure 3:
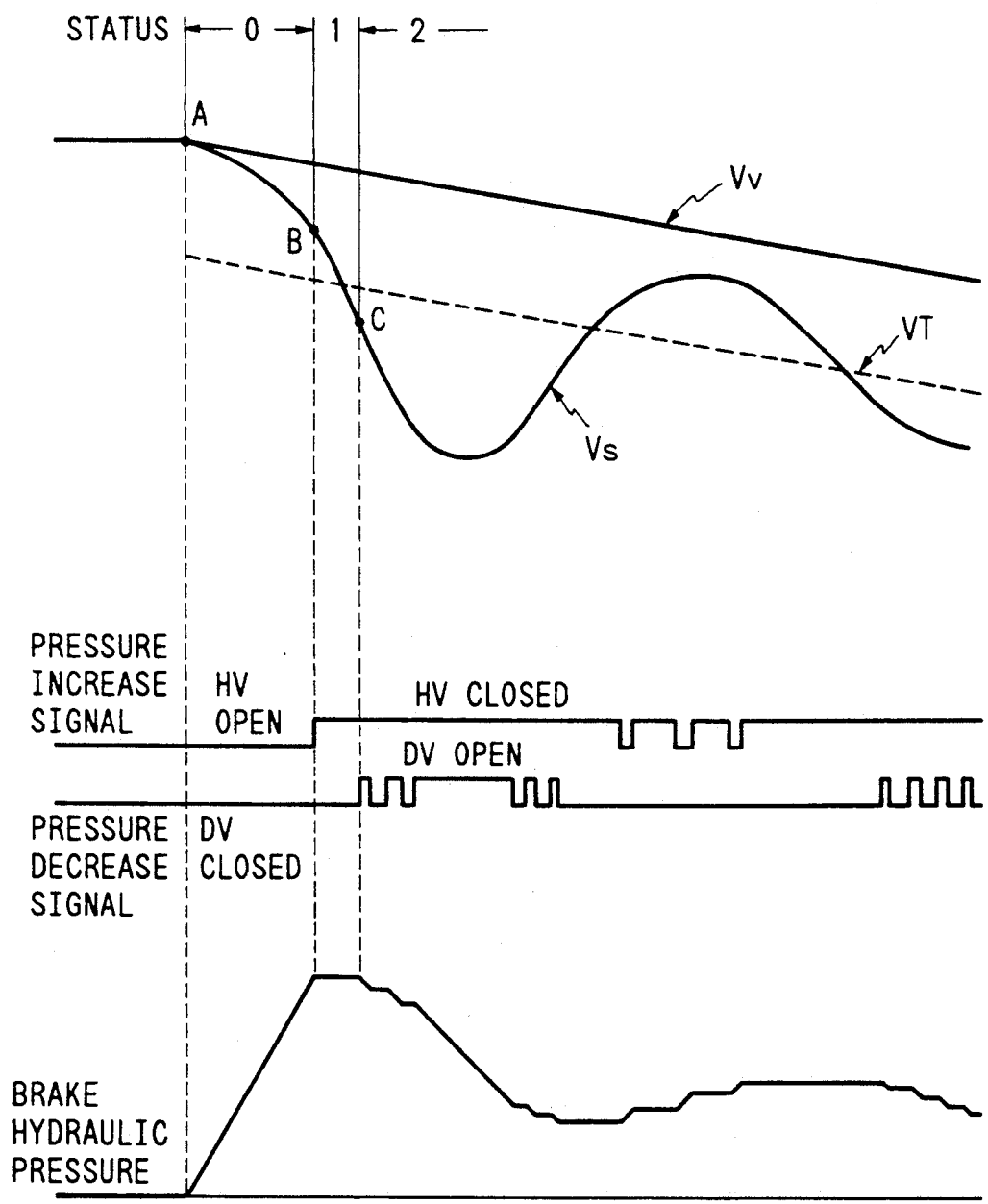
FIG. 3 shows a timing chart illustrating the anti-lock system of FIG. 1.
Figure 4:
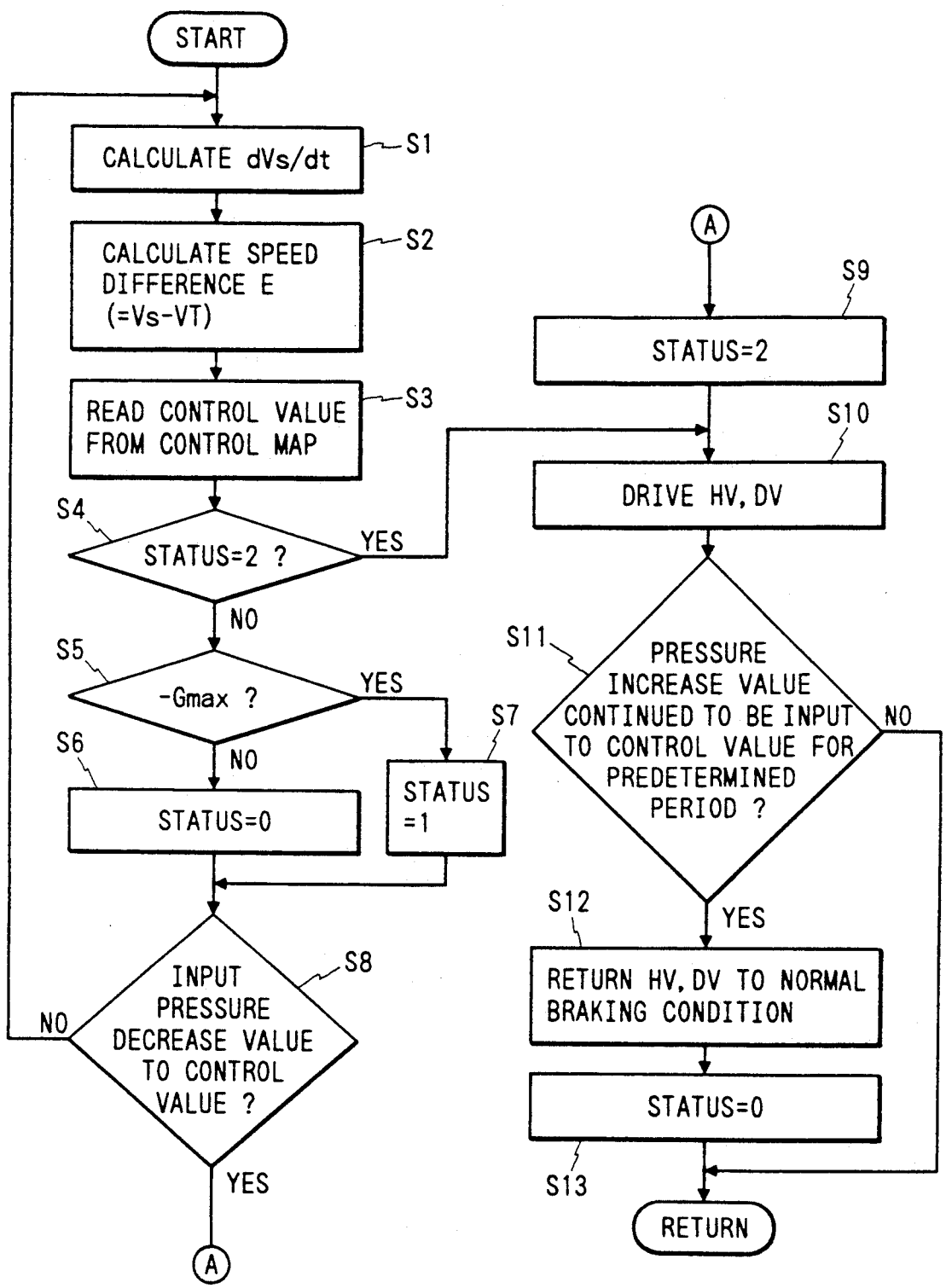
FIG. 4 shows a flow chart of the operation of the control method of the embodiment.

An example of the anti-lock control of the vehicle in the method is described with reference to FIG. 3 which is a time chart of the method, and FIG. 4 which is a flow chart of the method, from now on. Statuses shown in FIG. 3 are first described.

The status 0 lasts from a time point A at which the brake switch 4a is turned on by depressing the brake pedal 4, to a time point B at which the rate dVs/dt of the decrease in the system speed Vs is judged to have reached a prescribed level −Gmax, or to a time point at which it is read from the control map that the anti-lock control is in the pressure holding region. In the status 0, the hold valve 6 is open, the decay valve 7 is closed, and the brake hydraulic pressure in the wheel cylinder 11 is increased by supplying the brake fluid from the master cylinder 3 to the wheel cylinder 11.

The status 1 lasts from the time point B to a time point at which a control value for the decrease in the brake hydraulic pressure in the wheel cylinder is entered from the control map into the modulator 5. At the time point B, the hold valve 6 is closed, and the brake hydraulic pressure is held constant.

The status 2 lasts from the time point at which the control value for the decrease in the brake hydraulic pressure is entered from the control map into the modulator 5, to a time point until which a control value for the increase in the brake hydraulic pressure has been entered from the map into the modulator 5 for a prescribed time period. In the status 2, the brake hydraulic pressure in the wheel cylinder 11 is decreased, held constant and increased on the basis of control values read from the control map.

The example of the anti-lock control is described with reference to FIG. 4 which is the flow chart. In step S1, the rate of dVs/dt of the increase or decrease in the system speed Vs is calculated. In step S2, the difference E =(Vs − VT) between the system speed Vs and the target speed VT is calculated. In step S3, a control value is read from the control map on the basis of the rate dVs/dt of the increase or decrease in the system speed Vs and the speed difference E which are calculated in the steps S1 and S2. In step S4, it is judged whether the anti-lock control has come into the status 2, namely, the control value for the decrease in the brake hydraulic pressure is entered from the control map. Since it is judged in step S4 in this example that the control has not yet come into the status 2, then, in step S5 it is judged whether the rate dVs/dt of the decrease in the system speed Vs has reached the prescribed level −Gmax. If it is judged in step S5 that the rate dVs/dt has not yet reached the prescribed level −Gmax, the anti-lock control is set in the status 0 in step S6. If it is judged in step S5 that the rate dVs/dt has reached the prescribed level −Gmax, the anti-lock control is set in the status 1 in step S7. Then, in step S8, it is judged whether the control value for the decrease in the brake hydraulic pressure is entered from the control map. If it is judged in step S8 that the control value is entered from the map, the anti-lock control is set in the status 2 in step S9, and a control mode is determined on the basis of the control value read from the control map and the duty ratio of a pressure increase signal to be applied to the hold valve HV or the duty ratio of a pressure decrease signal to be applied to the decay valve DV is determined, in step S10, to open or close the valve to make the brake hydraulic pressure increased, held constant or decreased. In step S11, it is judged whether a control value for the increase in the brake hydraulic pressure has been entered from the control map for the prescribed time. If it is judged in step S11 that the control value for the pressure increase has not been entered from the control map for the prescribed time, then the step S1 is taken again. If it is judged in step S11 that the control value for the pressure increase has been entered from the control map for the prescribed time, the hold valve HV and the decay valve DV are put back into a normal braking state which is not an anti-lock control state. In that case, the hold valve HV is opened and the decay valve DV is closed in step S12, and the anti-lock control is set in the status 0 in step S13.

Figure 5:
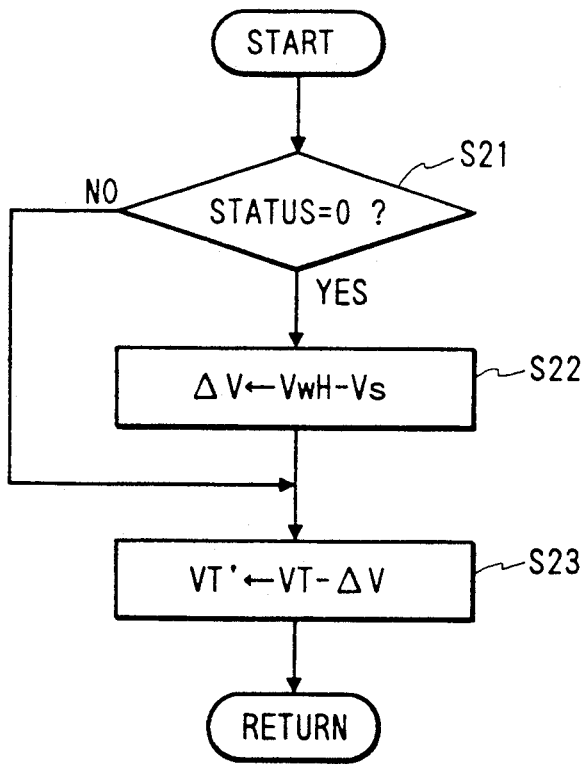
FIG. 5 shows a flow chart for modifying a target speed VT in accordance with the control method of the embodiment.

FIG. 5 is a flow chart of a target speed modification routine which is executed by using the target speed modification means 17. The routine is described with reference to FIG. 6 as well as FIG. 5 from now on. In step S21, it is judged whether the anti-lock control is in the status 0, namely, the control is at the time point A at which the brake switch 4a is turned on by depressing the brake pedal 4. If it is judged in step S21 that the control is at the time point A, the speed difference ΔV between the highest wheel speed VwH and the system speed Vs is calculated in step S22, and a speed equal to the remainder in the subtraction of the speed difference ΔV from the target speed VT common to the control channels of the anti-lock control apparatus is set as the modified target speed VT′ for the control channel of the system speed Vs and transmitted to the speed difference calculation means 15 in step S23.

In the method, the speed which follows, with prescribed speed difference, the estimated vehicle speed Vv calculated on the basis of the highest wheel speed VwH among four wheel speeds Vw, is set as the target speed VT common to the control channels in the straight movement of the vehicle, as described above. The control map indicating the brake hydraulic pressure increase region, the brake hydraulic pressure decrease region, the different values of the gradient of pressure increase in the pressure increase region and those of the gradient of pressure decrease in the pressure decrease region in terms of relationship between the rate of the increase or decrease in the system speed Vs and the difference between the system speed Vs and the target speed VT as shown in FIG. 2 is prepared. The brake hydraulic pressure in the wheel cylinder 11 is increased and decreased through the reading of the control map.

Figure 6:
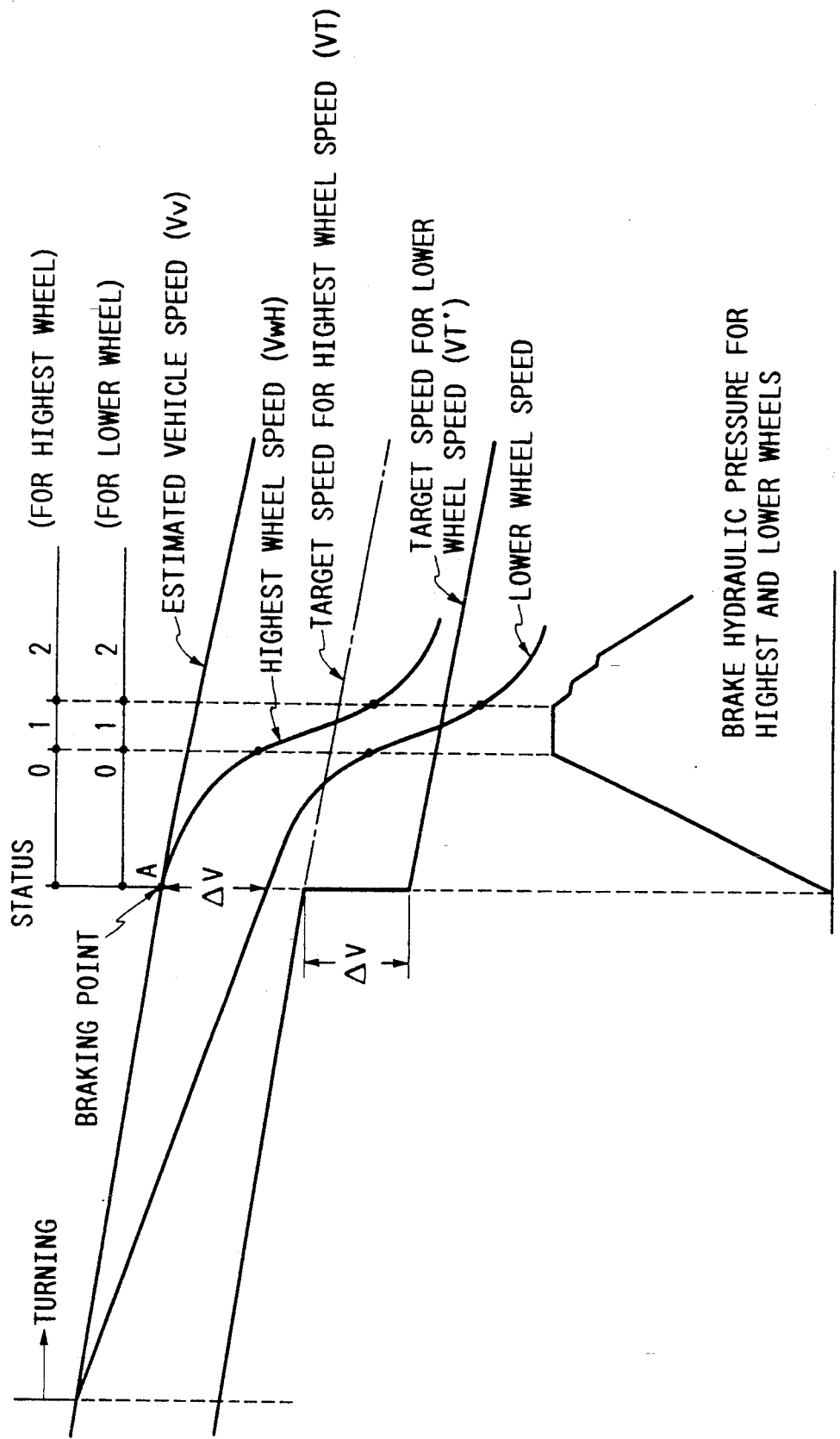
FIG. 6 shows a timing chart illustrating the control system of FIG. 1 with modifying the target speed.

In turning of the vehicle, the system speed Vs which is the wheel speed Vw of the inner vehicle wheel is lower than the other system speed Vs which is the wheel speed of the outer vehicle wheel. Therefore, as shown in FIG. 6, at the time point A at which the brake switch 4a is turned on, the speed difference ΔV arises between the highest wheel speed VwH and the system speed Vs which is the speed of the inner wheel. Accordingly, in the present invention, the speed lower by the speed difference ΔV than the target speed VT common to the control channels is set as the modified target speed VT′ for the control channel for the speed of the inner wheel so that the speed difference E shown along the axis of abscissas in the control map for the control channel for the speed of the inner wheel is modified. The brake hydraulic pressure in the wheel cylinder 11 for the inner wheel is regulated on the basis of the modified control map so that the system speed Vs which is the speed of the inner wheel converges to the modified target speed VT′.

Figure 7:
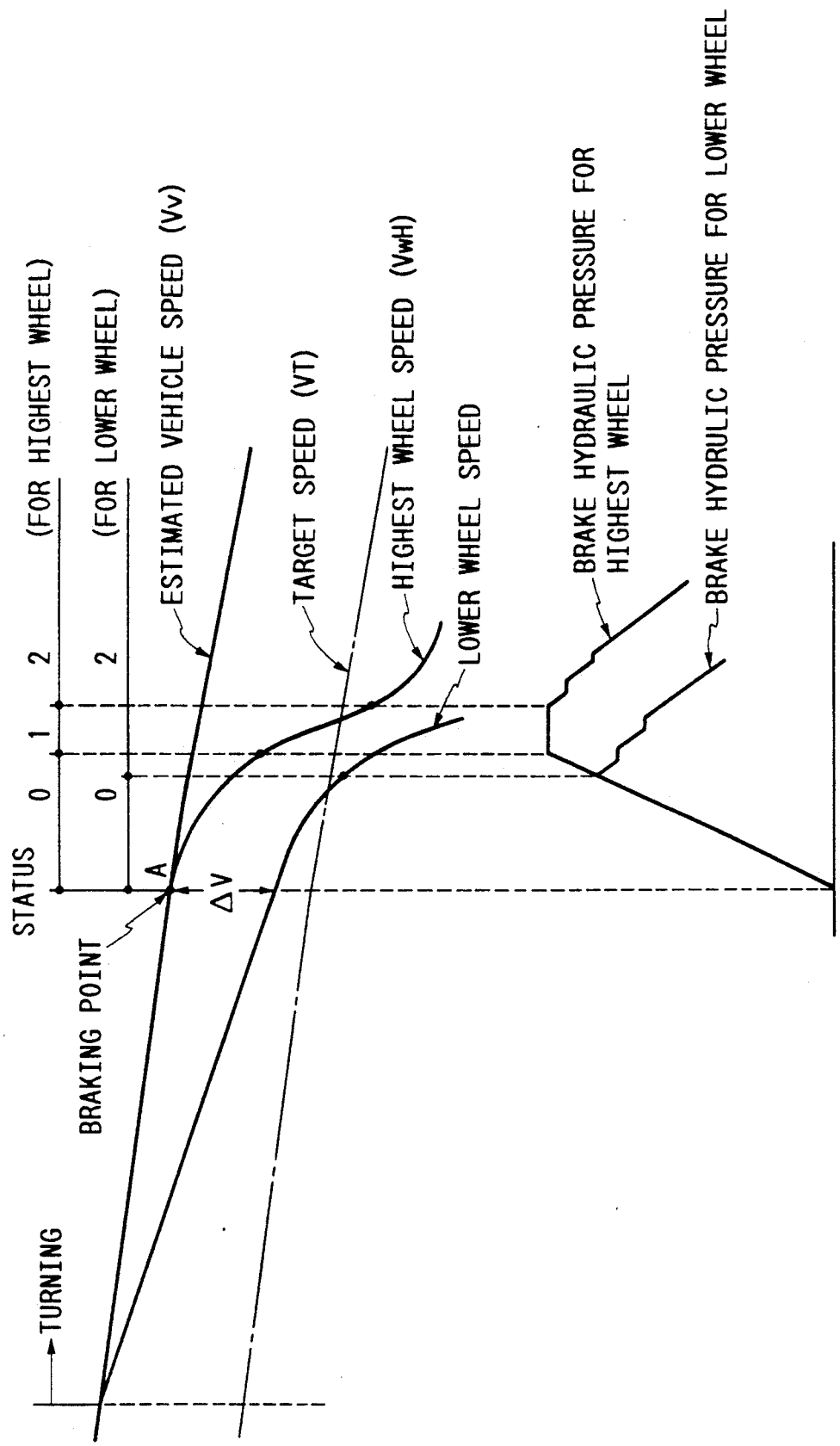
FIG. 7 shows a timing chart illustrating a comparative control system without modifying the target speed.

FIG. 7 is a time chart of a comparative example of another anti-lock control method in which a target speed for a control channel for the inner wheel of a vehicle at the time of braking in turning thereof is not modified. When the braking is started in turning, anti-lock control is performed so that a system speed Vs which is the speed of the inner wheel of the vehicle converges to the target speed VT common to the control channels of an anti-lock control apparatus. For that reason, the decrease in the brake hydraulic pressure in a wheel cylinder for the inner wheel is started earlier than in a control channel for the other wheel of the highest speed so that the pressure becomes insufficient. This is a problem. In contrast with that, in the embodiment of the present invention, the target speed VT is modified for the inner wheel of the vehicle at the braking in turning thereof so that the modified target speed VT′ appropriate for the inner wheel is set, as shown in FIG. 6. For that reason, it is possible to prevent the problem that the anti-lock control is too early performed on the inner wheel of the vehicle at the time of braking in turning thereof to make the brake hydraulic pressure for the wheel insufficient.

What is claimed is:

1. An anti-lock control apparatus for preventing locking of automotive wheels during braking by using a plurality of brake hydraulic pressure control channels for all said automotive wheels, comprising:
    first circuit means for sensing wheel speeds of said automotive wheels;
    second circuit means for setting system speeds for said control channels based on said wheel speeds;
    third circuit means for setting an estimated vehicle speed based on a highest wheel speed among said wheel speeds;

fourth circuit means for setting a target speed to track said estimated vehicle speed with a predetermined speed difference therefrom;

fifth circuit means for determining if a speed difference exists between each of said systems speeds and said highest wheel speed when braking is initiated and modifying said target speed when a speed difference exists, said modification being defined as lowering said target speed by said speed difference; and sixth circuit means for alternately increasing and decreasing brake hydraulic pressure to converge said system speed to said target speed through said control channels, wherein said fifth circuit means continues to modify said target speed while said sixth circuit means is in operation.

2. An interlock control apparatus as in claim 1, further comprising:

seventh circuit means for calculating an acceleration from each of said system speeds; and eighth circuit means for calculating a second speed difference between each of said system speeds and said target speed.

3. An anti-lock control apparatus as in claim 2, wherein said sixth circuit means alternately increases and decreases brake hydraulic pressure by an amount, said amount being determined by using information from said seven circuit means and said eighth circuit means.

4. An anti-lock control apparatus as in claim 1, wherein said fourth circuit means sets a target speed for each control channel and said fifth circuit means modifies said target speed for each respective control channel where said system speed and said highest wheel speed are different.

5. An anti-lock control method for preventing locking of vehicle wheels during braking by utilizing a plurality of systems associated with said vehicle wheels, comprising the steps of:

determining speeds of said vehicle wheels;

determining system speeds based on said speeds of wheels;

determining a highest wheel speed from among said speeds of said vehicle wheels;

determining an estimated vehicle speed based on said highest wheel speed;

determining a respective target speed for each of said system, said respective target speed being said estimated vehicle speed lowered by a predetermined speed difference;

when braking the vehicle, comparing said highest wheel speed with each of said system speeds;

if a first respective speed difference exists between said highest wheel speed and a system speed for a respective system, modifying said respective target speed by lowering it by said first respective speed difference so determined; and alternately increasing and decreasing said brake hydraulic pressure to converge each of said system speeds to said respective target speed, whereby said modification of said respective target speed step is repeated while said alternately increasing and decreasing said brake hydraulic pressure step is executed.

6. The method according to claim 5, further comprising the steps of:

calculating an acceleration from each of said system speeds;

calculating a second respective speed difference between each of said system speeds and said respective target speed; and utilizing said calculation of said acceleration and said calculation of said second respective speed difference to determine a respective amount by which to alternately increase and decrease said brake hydraulic pressure, whereby said modification of said respective target speed step is repeated while said calculation of an acceleration step, said calculation of a second respective speed difference step and said utilization step are executed.

7. The method according to claim 6, wherein said utilizing step comprises preparing a control map in which a pressure increase region and a pressure decrease region of said brake hydraulic pressure and a pressure increase gradient in the pressure increase region and a pressure decrease gradient in the pressure decrease region are represented in terms of said acceleration and said second respective speed difference between each of said system speeds and each respective target speed, and reading said control map and utilizing a command read therefrom when alternately increasing and decreasing said brake hydraulic pressure.

8. The method according to claim 6, wherein said utilizing step comprises preparing a control map in which a pressure increase region and a pressure decrease region of said brake hydraulic pressure and a pressure increase gradient in the pressure increase region and a pressure decrease gradient in the pressure decrease region are represented in terms of said acceleration and said second speed difference between each of said system speeds lower than said highest wheel speed and each respective target speed, and reading said control map and utilizing a command read therefrom when alternately increasing and decreasing said brake hydraulic pressure for each of said wheels with corresponding system speeds lower than said highest wheel speed.

* * * * *